3,803,099
ESTER INTERLINKING AGENTS FOR POLYESTER
FORMING PROCESSES
Yuzi Okuzumi, Akron, Ohio, assignor to The Goodyear Tire & Rubber Company, Akron, Ohio
No Drawing. Filed Aug. 17, 1972, Ser. No. 281,597
Int. Cl. C08g 17/01
U.S. Cl. 260—75 M          6 Claims

ABSTRACT OF THE DISCLOSURE

An improved process for preparing high molecular weight linear polyesters and copolyesters at high polycondensation rates wherein the improvement comprises adding a carbonic carboxylic acid anhydride to a polycondensation reaction mixture.

This invention relates to improved processes for preparing polycondensation polyester resins. Particularly this invention relates to the rapid preparation of polycondensation polyester and copolyester resins of high molecular weight which have fiber and film forming ability. More particularly this invention relates to the addition of certain additive compounds which accelerate the polycondensation reaction of polyester and copolyester resin forming reaction processes resulting in obtaining polyester and copolyester resins of high molecular weight in short periods of time.

It is known that high molecular weight linear polyester and copolyester resins can be prepared by reacting at least one free dicarboxylic acid or at least one dicarboxylic acid body, such as a lower alkyl (i.e., $C_1$–$C_4$) ester derivative of a dicarboxylic acid, with at least one glycol of the formula $HO(CH_2)_nOH$ where $n$ is an integer ranging from 2 to 10 to form the corresponding glycol ester derivative of the dicarboxylic acid. This glycol ester is then polycondensed under conditions of elevated temperatures and reduced pressures to form high molecular weight linear polyester or copolyester resin. In accordance with the present invention it has been found that in a process for preparing high molecular weight linear polyester and copolyester resins where, in a first step, at least one dicarboxylic acid or lower alkyl ester thereof is reacted with at least one glycol to form a molten polyester or copolyester prepolymer and in a second step polycondensing said molten polyester or copolyester prepolymer in the presence of a polycondensation catalyst under reduced pressures and elevated temperatures, the slow polycondensation reaction rates encountered in the second step can be overcome by the addition of an ester interlinking agent selected from the group consisting of carbonic-dicarboxylic acid anhydrides corresponding to the general formula

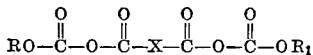

wherein X is a divalent organic radical selected from the group consisting of (1) divalent aliphatic radicals (2) divalent cycloaliphatic radicals and (3) divalent substituted and unsubstituted aromatic radicals wherein said substitution is selected from halogen and alkyl radicals and where R and $R_1$ are selected from the group consisting of substituted and unsubstituted monovalent aryl radicals wherein said substitution is selected from halogen and alkyl, aryl, alkoxy and aryloxy radicals, R and $R_1$ may or may not be the same. The ester interlinking agents of this invention are added to the polycondensing molten polyester or copolyester prepolymer of the second step at a time when the polycondensing prepolymer has obtained an intrinsic viscosity of at least 0.3 as determined on a 0.4 gram sample dissolved in 100 milliliters of a 60/40 phenol/tetrachloroethane solvent at 30.0° C.

The term "polyester" as employed hereinafter in this disclosure is understood to include both homopolyester and copolyester. By the term "high molecular weight" is meant a polyester polymer having an intrinsic viscosity of at least 0.4 and preferably at least 0.6 or higher.

An example of the invention is set forth below for illustrative purposes only.

EXAMPLE

Two hundred and ten grams of poly(ethylene terephthalate) having an intrinsic viscosity of 0.607 were prepared by polycondensing bis-(hydroxyethylene) terephthalate in the presence of antimony oxide at reduced pressure and elevated temperature. To each of three glass reaction tubes were added 30 grams of this resin. The reaction tubes were then placed in a heated (280° C.) circulating oil bath and polymers were allowed to melt under a nitrogen atmosphere. After 30 minutes, varying amounts of bis(phenylcarbonic) isophthalic acid anhydride ester interlinking (IA) agents were added to two of the three reaction tubes and stirred for five minutes. The pressure in the tubes was then reduced to 0.05 millimeter of mercury and polymerized with constant stirring at 280° C. for 25 minutes. The table below sets forth representative data from the above experiments.

TABLE

| Experiment No.: | Mol ratio IA:polyester | Initial IV | Final IV |
|---|---|---|---|
| 1 | a 0:1 | .607 | .697 |
| 2 | 1:1 | .607 | .952 |
| 3 | 0.5:1 | .607 | .882 | a Control.

As can be seen from the above table, the ester interlinking agents for this invention provide substantial improvement in the polycondensation reaction rate over that when no ester interlinking agent is employed.

The invention has been illustrated particularly with respect to accelerating the production of high molecular weight polyethylene terephthalate. The additive compounds of the present invention can also be used to accelerate the production of other high molecular weight polycondensation polyester resins. Representative examples of such other polycondensation polyester resins include resins derived from dicarboxylic acids or lower alkyl ester derivatives thereof and glycols, such as polytetramethylene terephthalate, polycyclohexane, dimethanol terephthalate, polyethylene dibenzoate and the like; copolyesters derived from a dicarboxylic acid or lower alkyl ester derivative thereof and mixtures of glycols, such as ethylene terephthalate-neopentyl terephthalate copolyesters, ethylene terephthalate-cyclohexane dimethanol terephthalate copolyesters and copolyesters derived from a mixture of dicarboxylic acids or lower alkyl ester derivatives thereof and one or more glycols such as copolyesters of terephthalic acid with another aromatic dicarboxylic acid, for example, ethylene terephthalate-ethylene isophthalate copolyesters, copolyesters of ethylene glyol and neopentyl glycol with terephthalic acid and isophthalic acid and copolyesters of an aromatic dicarboxylic acid such as terephthalic acid with an aliphatic acid, for example, ethylene terephthalate-ethylene sebacate copolyester and ethylene terephthalate-ethylene adipate copolyester. Dicarboxylic acids from which the resins can be derived are aliphatic dicarboxylic acids such as adipic acid, sebacic acid, azelaic acid; and aromatic dicarboxylic acids such as orthophthalic acids, isophthalic acid, terephthalic acid, bibenzoic acid, naphthalic acid and the like. The resins can be made from various glycols such as those of the formula $HO(CH_2)_nOH$ where $n$ is an integer ranging from 2 to 10, including ethylene glycol, propylene glycol, tetramethylene glycol, pentamethylene glycol, hexamethylene glycol, decamethylene glycol and the like, alkyl substituted polymethylene glycols such as neopentyl glycol and 2-methyl-2-ethylene and cyclic glycols such as cyclohexanedimethanol and 2,2,4,4-tetramethyl-1,3-cyclobutene diol. Ethylene glycol is a preferred glycol because of its low cost and ready availability.

The invention has been illustrated particularly with respect to the carbonic-carboxylic acid anhydride, bis(phenylcarbonic) isophthalic acid anhydride. In the case of this particular carbonic-carboxylic acid anhydride, X in the above formula is the divalent unsubstituted phenylene radical and R and $R_1$ in the above formula are the monovalent unsubstituted phenyl radical. Other carbonic-carboxylic acid anhydrides useful as ester interlinking agents include those wherein X is a divalent aliphatic radical containing at least 3 carbon atoms such as propylene, pentylene, neopentylene, octylene, dodecylene and the like; divalent cycloaliphatic radicals having at least 4 carbon atoms such as cyclobutylene, cyclopentylene, cyclohexylene and the like; divalent unsubstituted aromatic radicals such as phenylene, diphenylene, naphthylene and the like, divalent substituted aromatic radicals wherein said substitution is selected from alkyl radicals having from 1 to 4 carbon atoms such as methyl, ethyl, propyl, isopropyl, butyl, sec.-butyl and tertiary butyl radicals and halogen such as chlorine and the like. Other useful carbonic-carboxylic acid anhydrides also include those wherein R and $R_1$ are selected from substituted and unsubstituted monovalent aryl radicals wherein said substitution is selected from halogen, alkyl radicals having from 1 to 4 carbon atoms, aryl, alkoxy and aryloxy radicals.

The carboxylic-carbonic acid anhydrides useful as ester interlinking agents in the present invention can be prepared in acordance with the general procedure described by Tarbell and Leister, J. Org. Chem. 23, 1149 (1958) with the exception that a dicarboxylic acid is employed and that the acid and the substituted or unsubstituted aryl chloroformate are reacted in a molar ratio of 1/2. When the carboxylic-carbonic acid anhydride is a mixed anhydride, that is, when R and $R_1$ in the above formula are not the same, then 1 mol of the acid is reacted with 1 mol each of two different arylchloroformates.

More specifically, representative examples of carbonic-carboxylic acid anhydrides include bis(phenylcarbonic) adipic acid anhydride, bis(methylphenylcarbonic) sebacic acid anhydride, bis(phenylcarbonic) cyclobutane dicarboxylic acid anhydride, bis(phenylcarbonic) cyclohexane dicarboxylic acid anhydride, bis(phenylcarbonic) terephthalic acid anhydride, bis(tolylphenylcarbonic) terephthalic acid anhydride, bis(diphenylcarbonic) isophthalic acid anhydride, bis(phenoxyphenylcarbonic) terephthalic acid anhydride, bis(phenylcarbonic) isophthalic acid anhydride, diphenyl phenylcarbonic terephthalic acid anhydride, tolylphenyl phenylcarbonic terephthalic acid anhydride, bis(chlorophenylcarbonic) isophthalic acid anhydride and the like. Of the carbonic-carboxylic acid anhydrides useful in the present invention those derived from aryl dicarboxylic acids and substituted or unsubstituted arylchloroformates are most preferred.

The amount of ester interlinking agent which can be employed to produce high molecular weight polyester resins in short periods of time is not critical. Generally the amount which can be employed ranges from 1.0/1.0 mol of ester interlinking agent per mol of molten polyester prepolymer having an intrinsic viscosity of at least 0.3. In practice a molar ratio of .05/1 to 1.0/1.0 is preferred.

The ester interlinking agent is charged into a reactor containing molten polyester prepolymer, said addition taking place under an inert gas atmosphere, e.g., nitrogen. The resin is then heated in the presence of a polycondensation catalyst at reduced pressure. The ester interlinking agent may be added all at one time (i.e., a single time addition), continuously, or intermittently at regular time intervals. Regardless of the mode of addition, however, the use of the ester interlinking agents of this invention notably shortens the time required to prepare high molecular weight polyester resin as compared to the time required when no ester interlinking agent is employed. If desired, it is possible to repeat the process two or more times to produce condensate polyester resin of a high degree of polymerization.

In the preparation of polyester resins various catalysts can be used. Simple catalysts for effectuating the ester interchange reaction used to prepare the polyester resin are zinc acetate, manganese acetate, calcium acetate and alkali metal alcoholates. Catalysts suitable for the condenstion reaction by which the high molecular weight polymers are prepared are soluble antimony compounds such as antimony trioxide, titanium compounds such as titanium alcoholate and polymeric ethylene glycol titanate.

The reactions by which the resins are prepared are in general carried out in accordance with the usual known techniques. Thus the reactions are preferably carried out in the absence of oxygen, generally in an atmosphere of inert gas such as nitrogen or the like, in order to lessen darkening and to make it possible to prepare a high molecular weight colorless or light colored product. The condensation reaction is carried out under reduced pressure, generally below 10 millimeters of mercury pressure, and usually at or below 1 millimeter of mercury pressure, at a temperature in the range of from about 260 to 290° C. to form high molecular weight polyester resin having an intrinsic viscosity of at least 0.4 as measured in a 60/40 phenol/tetrachloroethane mixed solvent at 30° C.

While certain representative embodiments and details have been shown for the purpose of illustrating the invention it will be apparent to those skilled in this art that various changes and modifications may be made therein without departing from the spirit or scope of the invention.

What I claim is:

1. In a process for the preparation of high molecular weight linear polyester and copolyester resins having intrinsic viscosities of at least 0.4 as determined on a 0.4 gram sample dissolved in 100 milliliters of a 60/40 phenol/tetrachloroethane solvent at 30.0° C. where, in a first step, at least one dicarboxylic acid or lower alkyl ester thereof is reacted with at least one glycol to form a molten polyester prepolymer and in a second step polycondensing said molten polyester prepolymer in the presence of a polycondensation catalyst under reduced pressures and elevated temperatures, the improvement which comprises adding to the polycondensing molten polyester prepolymer of the second step, at a time when the intrinsic viscosity of the polycondensing molten polyester prepolymer of the second step is at least 0.3, an ester interlink agent corresponding to the general formula

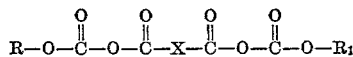

wherein X is a divalent organic radical selected from the group consisting of (1) divalent aliphatic hydrocarbon radicals, (2) divalent cycloaliphatic hydrocarbon radicals, and (3) divalent substituted and unsubstituted aryl hydrocarbon radicals wherein said substitution is selected from halogen and alkyl radicals and where R and $R_1$ are selected from the group consisting of substituted and unsubstituted monovalent aryl radicals wherein said substitution is selected from the group consisting of halogen and alkyl, aryl, alkoxy and aryloxy radicals.

2. The improved process of claim 1 wherein the high molecular weight linear polyester prepared is polyethylene terephthalate.

3. The improved process of claim 1 wherein the improvement comprises adding to the polycondensing molten polyester prepolymer of the second step, at a time when the intrinsic viscosity of the molten polyester prepolymer of the second step is at least 0.3, an ester interlinking agent selected from the group consisting of carbonic-carboxylic acid anhydrides corresponding to the formula

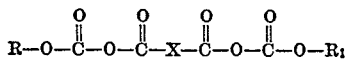

wherein X is a divalent organic radical selected from the group consisting of divalent substituted and unsubstituted aryl radicals wherein said substitution is selected from halogen and alkyl radicals and where R and $R_1$ are selected from the group consisting of substituted and unsubstituted monovalent aryl radicals wherein said substitution is selected from halogen and alkyl, phenyl, tolyl and phenoxy radicals.

4. The improved process of claim 3 wherein in the formula

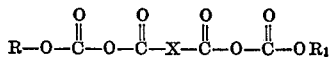

which defines the carbonic-carboxylic acid anhydrides comprising the improvement, X is a divalent unsubstituted aryl radical and R and $R_1$ are unsubstituted monovalent aryl radicals.

5. The improved process of claim 4 wherein the carbonic-carboxylic acid anhydride is bis(phenylcarbonic) isophthalic acid anhydride.

6. The improved process of claim 3 wherein the molar ratio of the carbonic-carboxylic acid anhydride to the polycondensing molten polyester prepolymer, having an intrinsic viscosity of at least 0.3, ranges from about 0.01/1 to 1/1.

References Cited

UNITED STATES PATENTS

| | | | |
|---|---|---|---|
| 3,714,125 | 1/1973 | Shima, et al. | 260—75 M |
| 3,444,141 | 5/1969 | Shima | 260—75 M |
| 3,433,770 | 3/1969 | Shima, et al. | 260—75 M |
| 3,082,191 | 3/1963 | Windholz | 260—78 |

WILLIAM H. SHORT, Primary Examiner

W. C. DANISON, JR., Assistant Examiner

U.S. Cl. X.R.

260—75 R